(12) United States Patent
Sykes et al.

(10) Patent No.: US 10,347,011 B2
(45) Date of Patent: Jul. 9, 2019

(54) INK EFFECTS

(71) Applicant: Microsoft Technology Licensing, LLC., Redmond, WA (US)

(72) Inventors: Sarah Sykes, Redmond, WA (US); Ian William Mikutel, Redmond, WA (US); Arianne Marie Taylor, Woodinville, WA (US); ArunKumar Narayanan Kotiedath, Redmond, WA (US); Anthony Neil Dart, Seattle, WA (US); Ana Ruth Resendez Rodriguez, Redmond, WA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 145 days.

(21) Appl. No.: 15/237,498

(22) Filed: Aug. 15, 2016

(65) Prior Publication Data

US 2017/0287172 A1    Oct. 5, 2017

Related U.S. Application Data

(60) Provisional application No. 62/317,333, filed on Apr. 1, 2016.

(51) Int. Cl.
*G06T 11/00* (2006.01)
*G06F 3/0484* (2013.01)
*G06F 17/24* (2006.01)
*G06F 3/048* (2013.01)

(52) U.S. Cl.
CPC ............ *G06T 11/001* (2013.01); *G06F 3/048* (2013.01); *G06F 3/04845* (2013.01); *G06F 17/242* (2013.01)

(58) Field of Classification Search
CPC .................................................... G06T 15/04
See application file for complete search history.

(56) References Cited

U.S. PATENT DOCUMENTS

| 6,201,549 | B1  | 3/2001 | Bronskill |
|---|---|---|---|
| 8,379,047 | B1  | 2/2013 | DiVerdi |
| 2005/0093874 | A1* | 5/2005 | Levene ................ G06T 15/04 345/582 |

(Continued)

OTHER PUBLICATIONS

"International Search Report and Written Opinion Issued in PCT Application No. PCT/US2017/024645", dated Jun. 16, 2017, 12 Pages.
"GMX-PhotoPainter Styles", Published on: Jun. 3, 2012 Available at: http://www.gertrudisgraphics.com/help/gmx-photopainter-styles.

(Continued)

*Primary Examiner* — Phi Hoang
(74) *Attorney, Agent, or Firm* — Merchant & Gould P.C.

(57) ABSTRACT

Document authoring that involves illustrating pen input in an authoring environment is herein improved to provide greater control of colors and patterns for representing the pen input in a graphical user interface. Colors and patterns are provided as effects that are applied to the illustrated pen input so that multiple textures or colors may be applied to the illustrated pen input without requiring the user to manually signal a switch in texture or colors or using multiple objects to represent the pen input. In various aspects, effects may be layered on top of each other, and the effects may be stretched or tiled depending on the size of the illustrated pen input.

20 Claims, 14 Drawing Sheets

(56) References Cited

U.S. PATENT DOCUMENTS

| | | | | |
|---|---|---|---|---|
| 2006/0250400 | A1* | 11/2006 | Sakuta | G09G 5/28 |
| | | | | 345/467 |
| 2007/0229526 | A1* | 10/2007 | Hsu | G06F 9/451 |
| | | | | 345/581 |
| 2008/0055314 | A1* | 3/2008 | Ziemski | G06T 11/40 |
| | | | | 345/441 |
| 2009/0160856 | A1* | 6/2009 | Hoguet | G06Q 10/06 |
| | | | | 345/420 |
| 2013/0120426 | A1* | 5/2013 | DiVerdi | G06T 11/001 |
| | | | | 345/589 |
| 2013/0127889 | A1* | 5/2013 | Winnemoeller | G06T 17/20 |
| | | | | 345/582 |
| 2013/0307861 | A1 | 11/2013 | Lang et al. | |
| 2013/0335452 | A1* | 12/2013 | Suchomel | G06T 11/203 |
| | | | | 345/660 |
| 2014/0215366 | A1* | 7/2014 | Ryu | G06F 3/0484 |
| | | | | 715/765 |
| 2015/0106755 | A1* | 4/2015 | Moore | G06F 3/0484 |
| | | | | 715/765 |
| 2015/0346954 | A1* | 12/2015 | Parag | G06F 3/04842 |
| | | | | 715/763 |
| 2015/0371417 | A1* | 12/2015 | Angelov | G06Q 10/101 |
| | | | | 345/442 |
| 2016/0042534 | A1 | 2/2016 | Tremblay et al. | |
| 2016/0158641 | A1* | 6/2016 | Summons | A63F 13/02 |
| | | | | 463/31 |
| 2017/0236020 | A1* | 8/2017 | Petkov | G06F 3/03545 |
| | | | | 345/179 |

OTHER PUBLICATIONS

Wick, Stefan, "Fun with Ink & XAML Part4: WPF BitmapEffects applied to Ink", Published on: Nov. 4, 2007 Available at: https://blogs.msdn.microsoft.com/swick/2007/11/04/fun-with-ink-xaml-part4-wpf-bitmapeffects-applied-to-ink/.

"Xara Tutorial—Xara Brushes", Published on: Jun. 4, 2014.

Rubino, Daniel, "Microsoft's super cool, must-have app Fresh Paint, now available for Windows Phone 8", published on: Jul. 22, 2013 Available at: http://www.windowscentral.com/microsofts-fresh-paint-app-now-available-wp8.

"Paintastic", Retrieved on: Mar. 30, 2016 Available at: http://alternativeto.net/software/paintastic/?platform=android.

"Photoline", Published on: Apr. 2009 Available at: http://alternativeto.net/software/photoline/

Liang, et al. "Image-Based Rendering for Ink Painting", In Proceedings of IEEE International Conference on Systems, Man, and Cybernetics, Oct. 13, 2013, pp. 3950-3954.

Li, et al., "Image-based Ink Diffusion Simulation and 3D Chinese Wash-ink Paintings Rendering", In Journal of WSEAS Transactions on Computers, vol. 14, Mar. 30, 2016, pp. 347-357.

Dong, et al., "Real-Time Image-Based Chinese Ink Painting Rendering", In Journal of Multimedia Tools and Applications, vol. 69, Issue 3, Apr. 2014, pp. 1-12.

Johns, Sheridan, "Create an Illustrated Watercolor and Ink Photo Effect in Photoshop", Published on: Feb. 19, 2014 Available at: http://design.tutsplus.com/tutorials/create-an-illustrated-watercolor-and-ink-photo-effect-in-photoshop-psd-35809.

* cited by examiner

INK EFFECTS

CROSS-REFERENCES TO RELATED APPLICATIONS

The present application claims benefit from U.S. Provisional Application No. 62/317,333 filed on Apr. 1, 2016 and having the title "INK EFFECTS," which is herein incorporated by reference in its entirety.

BACKGROUND

Ink input, via touchscreen or pointing device, provides users the ability to apply freeform input to an electronic authoring environment. For example, when using the Illustrator® graphic design software (available from Adobe Systems Inc. of San Jose, Calif.), the Keynote® presentation application (available from Apple Inc. of Cupertino, Calif.), Bamboo™ Paper drawing application (available from Wacom Co., Ltd. of Kazo, Japan) or another electronic authoring environment, a user may apply a pen, stylus, or finger via a touchscreen or select a pen input option in a user interface for input via a mouse or other pointing device to provide ink input.

Although users may select various effects for the ink input, affecting the size (e.g., 6 point, 8 pixels, ¼ inch), shape (e.g., squared, rounded, etc.), color, transparency, and texture (e.g., a crayon texture, a paintbrush texture, a calligraphy texture) of the displayed ink object, these effects are basic shape and color effects and users often desire greater ability to highlight content with ink input than is afforded by basic shape and color choices. Additionally, for the user to apply multiple shape and color effects to ink input, the ink input must be broken into multiple objects, with individual effects being applied to each object, thus increasing the workload on the user, and requiring additional system resources to maintain those separate objects in memory.

SUMMARY

This summary is provided to introduce a selection of concepts in a simplified form that are further described below in the Detailed Description section. This summary is not intended to identify all features of the claimed subject matter, nor is it intended as limiting the scope of the claimed subject matter.

Systems and methods are provided herein to enable a more efficient interactivity for ink input that enables variable effects to be applied to the ink input as it is illustrated in the graphical user interface of an electronic authoring environment without the need for a user to create multiple objects to which to apply separate effects. An effect definition is selected by a user to apply to a new or existing ink input object in the electronic authoring environment, and the ink input object pulls its effects from the effect definition. In various aspects, the effect definition is anchored to the ink input object, and depending on the size of the ink input object, is tiled or stretched to meet or exceed the size of the ink input object. The ink input object may be anchored at a random position of the effect definition or a defined position in the effect definition (based on other ink input objects, position of the object in the authoring environment, orientation of the object), and the ink input object may include multiple effects in layers. By employing aspects of the present disclosure, an improved user experience is provided and less memory and fewer processing resources are expended to provide advanced effects to ink objects.

The details of one or more aspects are set forth in the accompanying drawings and description below. Other features and advantages will be apparent from a reading of the following detailed description and a review of the associated drawings. It is to be understood that the following detailed description is explanatory only and is not restrictive; the proper scope of the present disclosure is set by the claims.

BRIEF DESCRIPTION OF THE DRAWINGS

The accompanying drawings, which are incorporated in and constitute a part of this disclosure, illustrate various aspects of the present disclosure. In the drawings.

DETAILED DESCRIPTION

Figure 1:
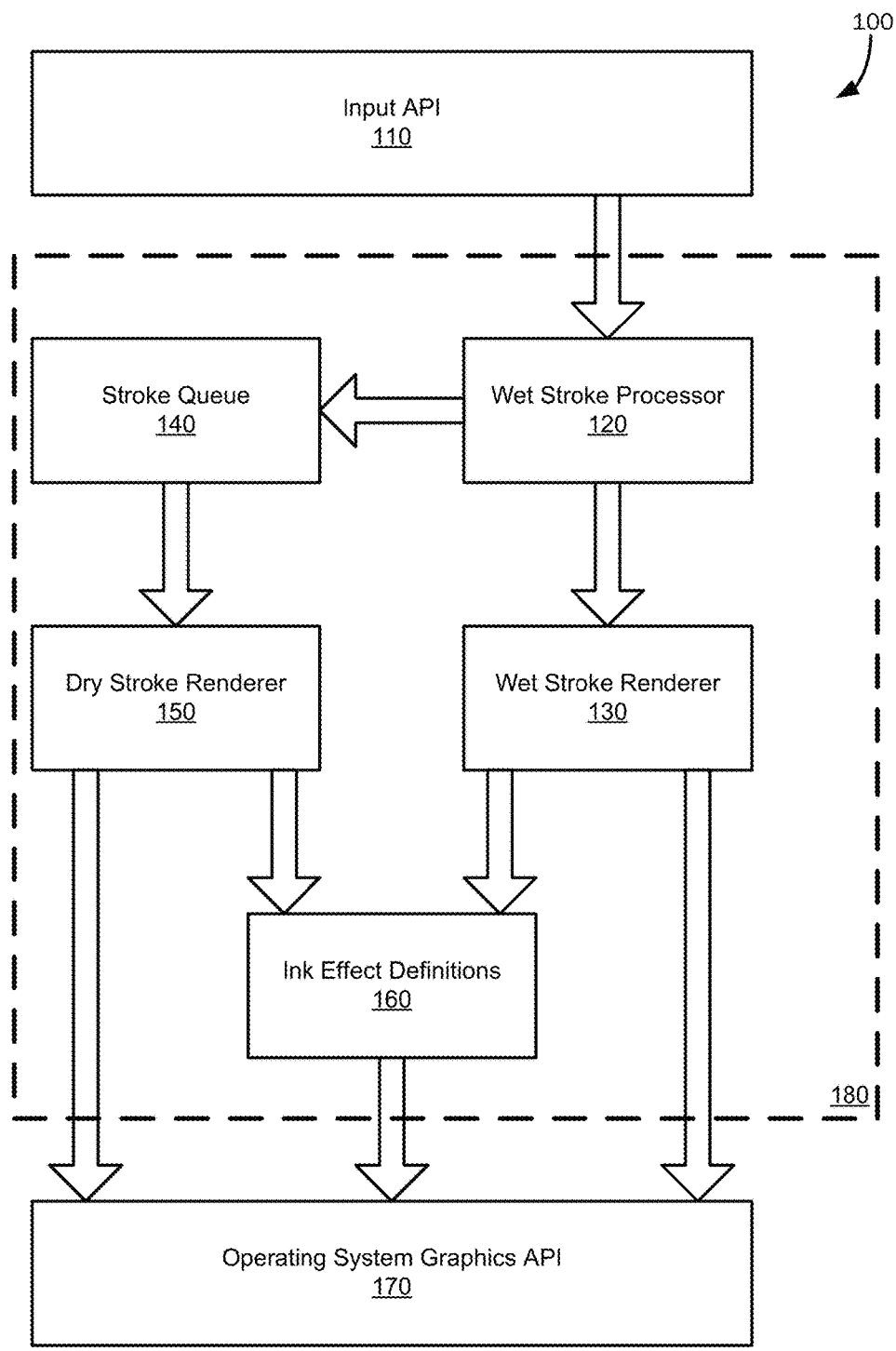
FIG. 1 illustrates a block diagram of a system enabled to accept ink inputs and apply advanced effects to the ink objects in an electronic authoring environment.

The following detailed description refers to the accompanying drawings. Wherever possible, the same reference numbers are used in the drawings and the following description to refer to the same or similar elements. While aspects of the present disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the present disclosure, but instead, the proper scope of the present disclosure is defined by the appended claims. Examples may take the form of a hardware implementation, or an entirely software implementation, or an implementation combining software and hardware aspects. The following detailed description is, therefore, not to be taken in a limiting sense.

Systems and methods are provided herein to enable a more efficient interactivity for ink input that enables variable graphical effects to be applied to the ink input as it is illustrated in the graphical user interface of an electronic authoring environment without the need for a user to create multiple objects to which to apply separate effects. An effect definition is selected by a user to apply to a new or existing ink input object in the electronic authoring environment, and the ink input object pulls its effects from the effect definition. In various aspects, the effect definition is anchored to the ink input object, and depending on the size of the ink input object, is tiled or stretched to meet or exceed the size of the ink input object. The ink input object may be anchored at a random position of the effect definition or a defined position in the effect definition (based on other ink input objects, position of the object in the authoring environment, orientation of the object), and the ink input object may include multiple effects in layers. By employing aspects of the present disclosure, an improved user experience is provided and less memory and fewer processing resources are expended to provide advanced effects to ink objects.

FIG. 1 illustrates a block diagram of a system 100 enabled to accept ink inputs and apply advanced effects to the ink objects in an electronic authoring environment (EAE), represented by dashed line 180. Examples of EAE 180 include, but are not limited to: word processing programs, presentation programs, illustration programs, note taking programs, spreadsheet programs, etc. The EAE 180 processes the inputs received from the input application program interface (API) 110 (i.e., pointer inputs), and passes them for rendering to the operating system graphics API 170, which in turn will pass the graphics of the EAE 180 (including ink objects) to an output device, such as, for example, a computer monitor or smartphone display.

The system 100 may receive pointer inputs from input devices such as mice, keyboards, remote controls, and the like, or from natural user input (NW) methods including those relying on speech recognition, touch and stylus recognition, gesture recognition both on screen and adjacent to the screen, air gestures, head and eye tracking, voice and speech, vision, touch, hover, gestures, and machine intelligence. Pointer inputs are those inputs that define a user's point of interaction within a graphical user interface, such as by a cursor represented within a given program or application and associated with a given input device. Inputs may be interpreted by the input API 110 for use in the EAE 180 as digital ink input. A user may signal to the system 100 that ink input is desired, as opposed to other styles of input, by selecting an ink input user interface (UI) element, using a particular input device, or contextually based on a position of a pointer in the EAE 180. For example, a user may use an ink input stylus on a touch screen to indicate that inking input is desired (as opposed to positional input via a mouse device), inking input may be enabled in a canvas area of an EAE 180 (as opposed to selection input in UI control areas of the EAE 180), or inking input may be enabled when a user actuates a mouse button (as opposed to positional input when the mouse button is unactuated). When the user has indicated that ink input is desired, the input API 110 receives the inputs from the input devices, and transmits coordinates and pressures (if available on a touch-based device) and other metadata to the EAE 180. The other metadata may include, but is not limited to: a device identifier (e.g., stylus one, stylus two), primary or secondary input (e.g., mouse button one or two, stylus nib or "eraser"), velocity of input, authoring mode of when input is received (e.g., editing mode, presentation mode, textbox input, freeform input), user-defined settings within the EAE 180, etc.

Input from the input API 110 is received by the wet stroke processor 120, which groups together the inputs into strokes. Inputs are collected until it is determined that a stroke is complete, such as, for example, a user lifts a stylus from a touch screen or touch input falls below a pressure threshold, releases a mouse button, a pointer remains motionless for a set period of time, etc. Strokes are passed from the wet stroke processor 120 to the stroke queue 140 for incorporation into a document and to the wet stroke renderer 130 for rendering and display to a user. As will be appreciated, while a stroke is in its "wet" state, it may be incomplete (i.e., the user may still be making that stroke), and it is passed from the wet stroke processor 120 to the wet stroke renderer 130 as it is being input so that the user receives feedback as to what the stroke looks like in the GUI while the user makes the stroke.

The wet stroke renderer 130 creates a geometry for the stroke in the "wet" state based on the coordinates (and, optionally, pressures and other metadata) in the authoring area of the graphical user interface (GUI) of the stroke as it has been received as well as the drawing parameters of the EAE 180. As will be appreciated, the drawing parameters of the EAE 180 may specify a shape and size of the geometry to be associated with the stroke. For example, a user may select a circle, square, slash, star, etc., as a shape (or stamp) for the stroke and a size designated of that shape (e.g., 2 pt, 6 pt. 0.25 cm, 1/16 inch, 25 pixels). The drawing parameters may also indicate an ink effect to apply to the stroke or options for the ink effect. The wet stroke processor 120 uses these inputs to create the geometry of the stroke as it will be seen in the GUI. These geometries are passed to the operating system graphics API 170 and may include an ink effect definition 160, when an ink effect has been selected by a user, so that the user can see the ink effect applied to the stroke while the user makes that stroke in the GUI, for example, seeing the "ink" flowing from a stylus into the GUI.

The stroke queue 140 receives completed strokes from the wet stroke processor 120 and integrates them into the document that the EAE 180 is editing. In various aspects, the coordinates and metadata (e.g., pressures, drawing parameters) of the input are stored within the document's framework, for example, as an object in an extensible markup language (XML) hierarchy or a JavaScript Object Notation (JSON) representation. The stroke queue 140 may retrieve objects from the document framework for display in the GUI as "dry" strokes when the file is reopened or a user navigates to a portion of the document in which the object resides, making that object visible or partly visible in the GUI as the user navigates the GUI. The user may modify the "dry" strokes via the GUI to change reference points, a scale of the strokes, or the drawing parameters.

The dry stroke renderer 150 creates a geometry for the stroke in the "dry" state based on the coordinates (and, optionally, pressures and other metadata) in the authoring area of the graphical user interface (GUI) of the stroke as it has retrieved from the document framework as well as the drawing parameters for the stroke. As will be appreciated, the drawing parameters of a dry stroke may differ than those set in the EAE 180 for new strokes, and the user may change the drawing parameters of the dry stroke via various dialogs and controls in the GUI. These geometries are passed to the operating system graphics API 170 and may include an ink effect definition 160, when an ink effect has been selected by a user, so that the user can see the ink effect applied to the strokes that have been committed to the EAE 180.

The ink effect definitions 160 define additional graphical effects that are applied to the geometries of the strokes shown in the GUI. These effects may be shown in various layers, and various behaviors that are set by the user, and discussed in relation to FIGS. 2-10. The definitions include image files (e.g., bitmap, GIF (graphics interchange format), PEG (joint photographic experts group), PNG (portable network graphic)) as well as spectral line (defining various colors to use in series with a stroke). In some aspects, animated images, such as animated GIFs, may be used as the image files for ink effect definitions 160 so that an animated effect, such as, for example, a flash, sparkle, wave, fade, pulse, etc., may be applied to the ink object.

When an image file is used as an ink effect definition 160, the strokes may specify anchoring properties (indicating a position and orientation) to the ink effect definition 160 or may use a random anchor point from which a mask may be applied. Similarly, when a spectral line is used as an ink effect definition 160, the starting color may be specified by an anchor or the starting color may be randomly assigned and the orientation of the spectral line relative to the geometry may be defined by the user or randomly assigned. Anchors may be assigned by a user to remain constant per stroke (e.g., to use the same anchor for each new stroke), to be based on the previous stroke (e.g., to use the prior stroke's endpoint as a new stroke's anchor point), to be based on the position or orientation of the stroke in the canvas, or to be randomly selected for each new stroke.

Ink effect definitions 160 may be stretched or tiled to meet or exceed the size of the ink objects in the EAE 180. For example, if a user has selected a spectral line of a rainbow pattern to apply as the user writes in the GUI, the rainbow may cycle from red to purple and back to red several times as the user inputs strokes. In another example, if a user has selected an image file, the image file may be stretched to match or exceed the size of an individual stroke or a collection of strokes, or the image file may be tiled to match or exceed the size of an individual stroke or a collection of strokes. As will be appreciated, a two-dimensional image file may be tiled in two dimensions (vertically and horizontally), and may be rotated or un-rotated when it is tiled to provide mirror symmetry or repeat the image.

In various aspects users may use ink effect definitions 160 included in the local deployment of the EAE 180, receive ink effect definitions 160 via a cloud-based element of the EAE 180, or define their own ink effect definitions (e.g., specify an image file, specify colors to use in a spectral line). When a definition is provided, it may be specified whether (and how) the image is to be tiled or stretched when applied to ink objects.

The operating system graphics API 170 handles the geometries and rendered graphical effects so that they will be displayed according to the display devices associated with the system 100. The geometries and ink effect definitions 160 are converted to pixel values appropriate for the user's display device and any overlay effects are provided. For example, for a given geometry and ink effect definition, the operating system graphics API 170 may render the ink object according to a first way (having x pixels with various hues and luminosities) when the ink object is displayed on a first display device but render the ink object according to a second way (having y pixels with various hues and luminosities) on a second display device, such as, for example, when a user views a presentation on a laptop monitor and switches display to a projector with a different resolution and color properties.

Figure 2:
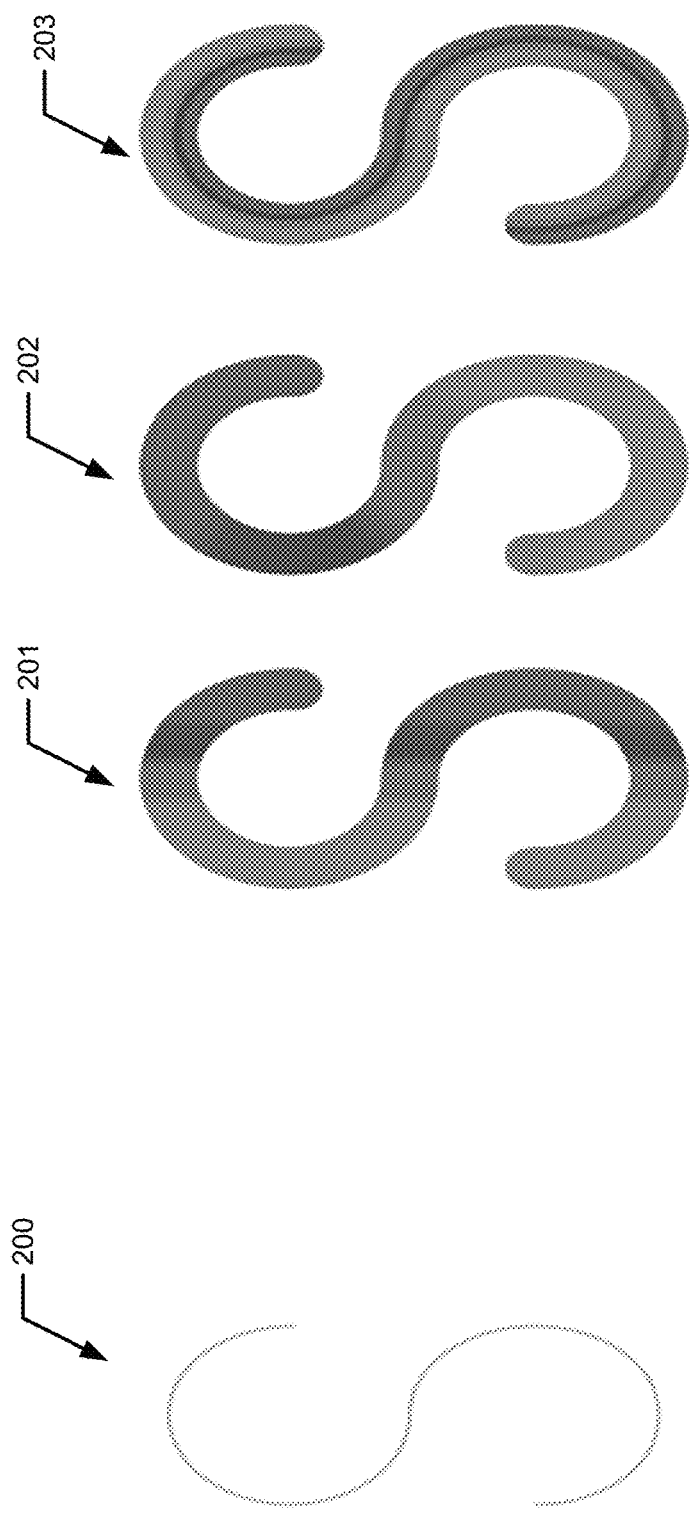
FIG. 2 illustrates several examples of advanced ink effects being applied to an ink input by applying an ink effect definition of a spectral line.

FIG. 2 illustrates several examples of graphical effects of advanced ink effects being applied to an ink input by applying an ink effect definition of a spectral line as a mesh to the geometry of the stroke. Illustrated on the left, the ink input 200 for the letter "S" is shown, which may have been input into the EAE 180 in a single stroke. A first example 201 illustrates a gradient ink effect defined by a spectral line that is applied horizontally across the ink input 200, a second example 202 shows a gradient ink effect applied along the path of the stroke for the ink input 200, and a third example 203 shows a gradient ink effect applied across the stroke for the ink input 200. Other applications are possible, such as, for example, a bloom from the center of the stroke which would expand as the stroke lengthens, and the preceding are given as non-limiting examples.

Figure 3:
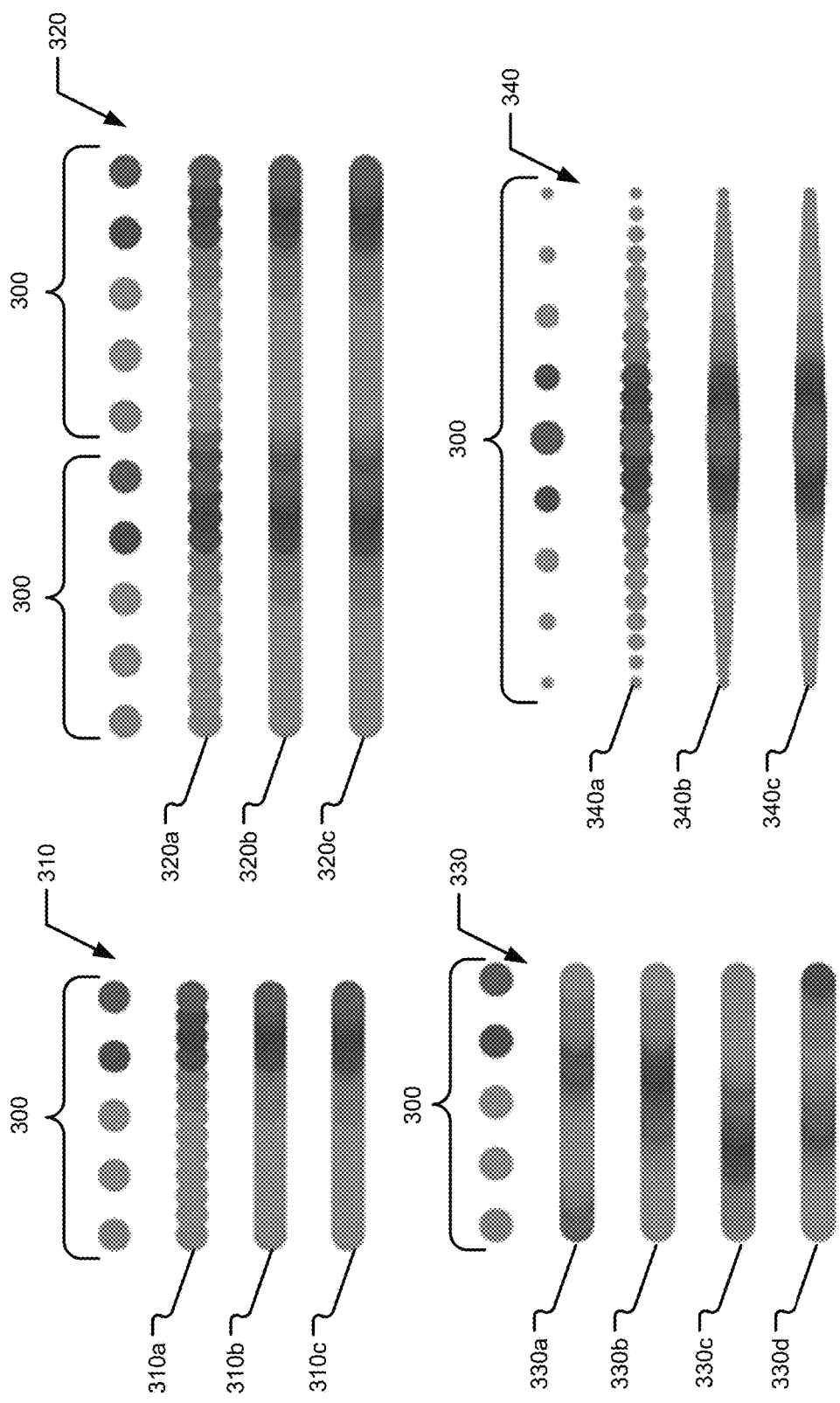
FIG. 3 illustrates several examples of spectral lines.

FIG. 3 illustrates several examples of spectral lines. A spectral line may be defined as a series of colors 300 (as illustrated herein as various shades in grayscale) that are cycled through as strokes are applied in the EAE 180 (as illustrated herein, drawn from left to right). As will be appreciated, more or fewer colors, in different orders, and with different hues and luminosities than shown in the illustrated series of colors 300 are possible, and the illustrated series of colors 300 for a spectral line is given as a non-limiting example.

Example 310 shows a single cycle of the spectral line applied to various stroke lines 310a-c, and example 320 shows two cycles of the same spectral line applied to various stroke lines 320a-c that are longer than those shown in relation to example 310. As will be appreciated, depending on the blending characteristics and the capabilities of the display device, a stroke may have the spectral line applied with more or fewer interstitial colors and the shape (herein illustrated as circles) of the ink input may similarly be blended or overlaid. Example 330 illustrates how subsequent strokes may use different anchor points in the spectral line definition (which may include interstitial colors) as each of strokes lines 330a-d are made, which may be useful to a user when combining or overlaying strokes so that they may be visually distinguished from one another in the GUI (e.g., when applying a crossbar or overlapping component of a character (as shown in "t", "お", cursive loops, etc.) or drawing in freeform), which is discussed in greater detail in regard to FIG. 5.

As shown in example 330, in various aspects, strokes lines 330a-d may reorder the colors in the series of colors 300 when anchor points are changed, or may keep the order of colors in the series of colors 300 and just change which color is the starting color in the order of colors in the series of colors 300.

Example 340 shows the implications of tying the series of colors 300 not to draw length of the stroke, but rather to a pressure or a velocity used to draw the stroke lines 340a-c, in which case a color is associated with a given pressure on a touchpad or a velocity in which a stroke is input. As illustrated herein, the velocity and/or pressure is also tied to a size parameter of the stroke illustration, and one of skill in the art will recognize that velocity and/or pressure may be also tied to other drawing parameters such as shape (e.g., shifting from the illustrated circles to different shapes) or only to color.

Figure 4:
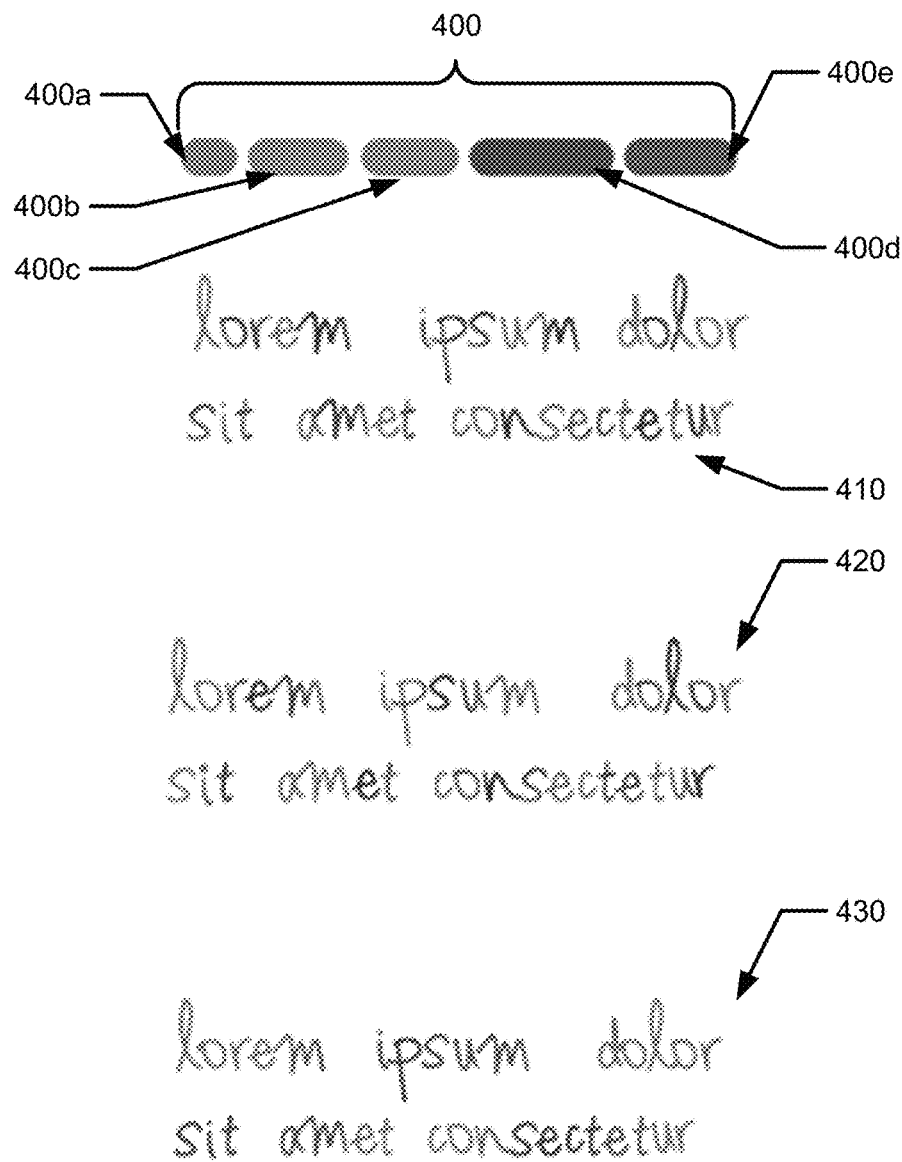
FIG. 4 illustrates various examples of distance assignments for a spectral line applied to example text strokes.

FIG. 4 illustrates various examples of distance assignments for a spectral line applied to example text strokes. As illustrated, a variable-length-enabled series of colors 400 (individually, colors 400a-e) is shown, with various relative lengths for the component colors, with first color 400a having the shortest length and fourth color 400d the longest. As will be appreciated, more or fewer colors, in different orders, with different hues and luminosities, and different relative lengths than shown in the illustrated length-enabled series of colors 400 are possible, and the illustrated variable-length-enabled series of colors 400 for a spectral line is given as a non-limiting example.

In practice, as a stroke is drawn, larger portions of the stroke will be illustrated with colors having longer lengths in the variable-length-enabled series of colors 400 and drawing parameters may specify draw distances for variable-length-enabled series of colors 400 or series of colors that have even lengths for their component colors. Example texts 410, 420, and 430 illustrate how a spectral line may be applied with different draw distances for colors independently or in connection with the lengths of colors in a series of colors 400. As will be seen from the relative locations of the changeover from the individual colors 400*a-e* according to the spectral line in the three example texts 410, 420, and 430, example text 410 illustrates the shortest draw distance (with the fifth color 400*e* first appearing in the "r" of "lorem"), example text 420 illustrates a medial draw distance (with the fifth color 400*e* first appearing in the "e" of "lorem"), and example text 430 illustrates the longest draw distance (with the fifth color 400*e* first appearing in the "p" of "ipsum"). As will be appreciated, if a spectral line uses a variable-length-enabled series of colors 400, the relative lengths will be stretched or shrunk according to a draw distance drawing parameter, and the draw distance parameters discussed herein are given as non-limiting examples; more or fewer options than shown in regard to FIG. 4 are possible in various aspects.

Figure 5:
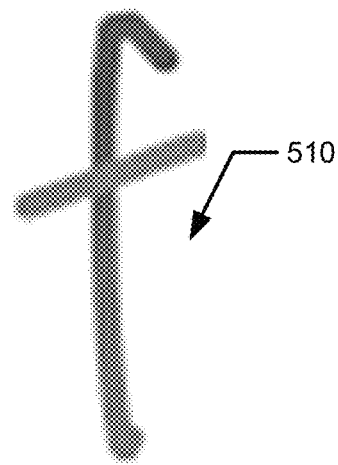
FIG. 5 illustrates two examples of anchoring the same text strokes differently to the same spectral line.
Figure 5:
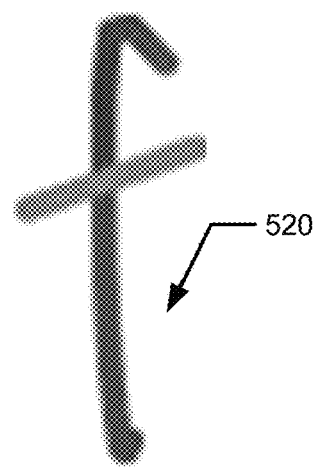

FIG. 5 illustrates two examples of anchoring the same text strokes differently to the same spectral line. As illustrated in both examples, the letter "f" has been written in using a spectral line of a cyclic rainbow (i.e., ranging from a first color to a second color to a third color with appropriate interstitial colors and repeating) with the ascender written with one stroke (from top to bottom) and the crossbar with a second stroke (from left to right). In the first example 510, the anchor point in the spectral line for each stroke is based on the last used color of the previous stroke, such that the crossbar for the letter "f" continues the coloration used last for the ascender of the letter "f" (shown as the first color). In the second example 520, however, a random anchor point or offset anchor point (e.g., a defined skip in colors) is used so that the end color from the last stroke is not used as the start color of the next stroke as shown by the ascender of the letter "f" ending in the second color, but the crossbar starting with the first color. As will be appreciated, if each stroke uses the same anchor (which is an option in some aspects, although not illustrated), the start color for the ascender stroke would be the same as the start color for the crossbar stroke in the example of writing the letter "f".

Figure 6:
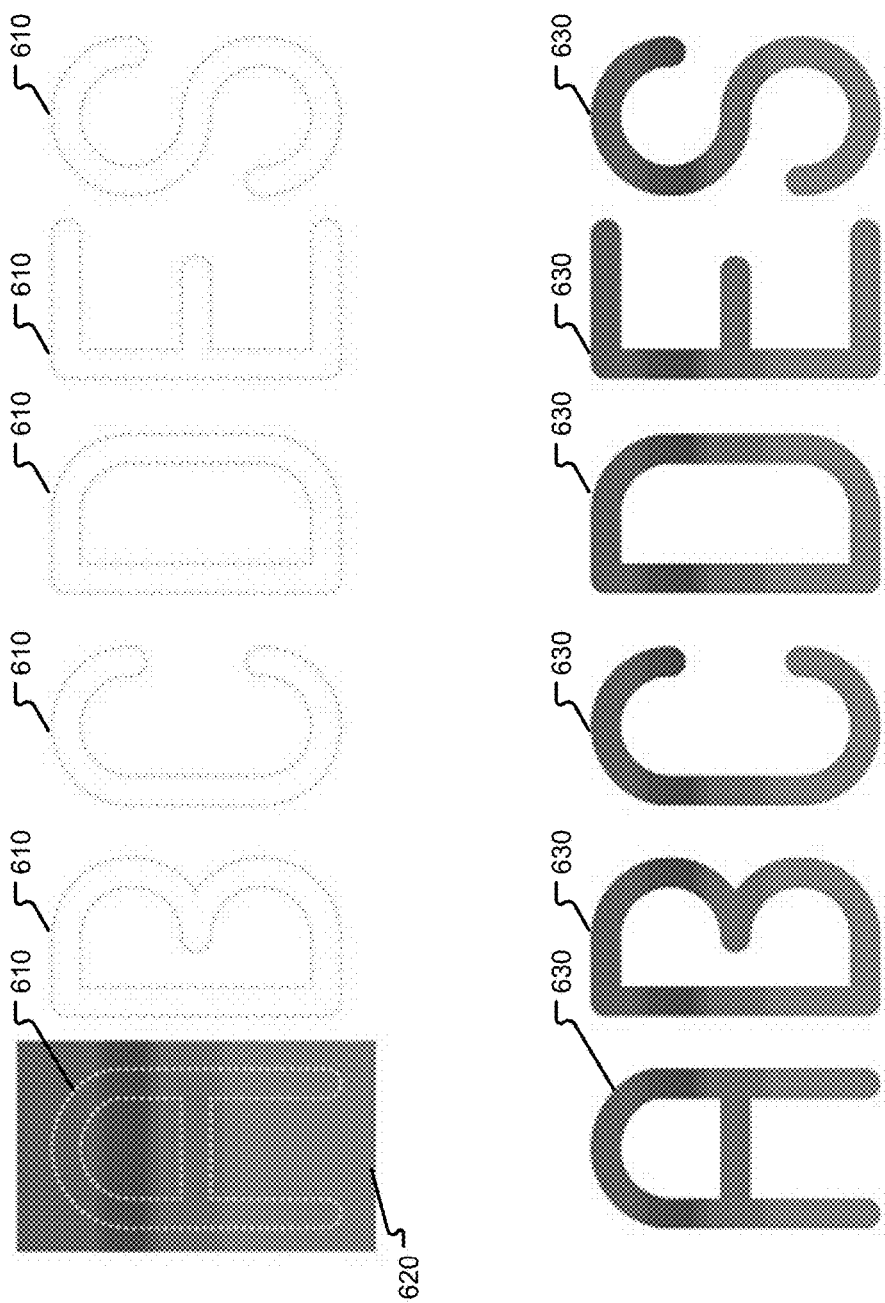
FIG. 6 illustrates an example of advanced ink effects being applied to strokes by applying an ink effect definition of an image file.

FIG. 6 illustrates an example of graphical effects of advanced ink effects being applied to strokes by applying an ink effect definition of an image file. The geometries 610 for strokes are illustrated via dashed lines, which are applied to an image definition 620 to create an effect mask 630 for each stroke. By creating an effect mask 630 rather than pushing a spectral line along a stroke, as discussed in regard to FIGS. 2-5, greater effect consistency across strokes and ink objects may be achieved. As shown, each of the geometries 610 have the same vertical (grayscale) rainbow effect, regardless of where a stroke began, crossed other strokes, or ended.

Figure 7:
FIG. 7 illustrates two examples of applying an image map with different anchors.

FIG. 7 illustrates two examples of applying an image map with different anchors. In both of the examples the same nine strokes have been provided, inputting the cursive of "Write the Rainbow."

The first example 710 has been anchored to the image definition of a rainbow according to the position of the stroke on a canvas, such that the highest portions of the "W" stroke is shown in first color, but the highest portions of the strokes for "the", which lie below the "W" stroke's highest portions on the canvas, are shown in a second color other than the first color. As will be appreciated, if the stroke positions are anchored individually to the image definition, the high points (medial points or low points, in various aspects) of each stroke would be the same color (assuming no stretching or shrinking) regardless of their relative positions on a canvas. Alternatively, the advanced ink effect may have been applied to the ink object of the collected strokes instead of the individual strokes, in which case the anchoring may have been achieved via anchoring the object to the image definition without regard to canvas position of the individual strokes.

The second example 720 has been anchored to the image definition perpendicular to the anchoring shown in the first example 710 such that the rainbow effect does not change color vertically, but horizontally across the ink object. As will be appreciated, the image definition for the rainbow has been applied across the ink object, rather than individually across each stroke, although in various examples, each stroke may be individually anchored, such that, for example, the "W" stroke would cycle through the (grayscale) rainbow from left to right, as would the "rite" stroke, the dot stroke, the crossbar stroke, etc. As will also be appreciated, if the image definition were not large enough to be mapped to the ink object, it may be stretched to the size of the ink object or tiled to meet the size of the ink object, and if the image file were tiled for the second example 720, the (grayscale) rainbow may repeat at various points in the cursive of "Write the Rainbow."

Figure 8:
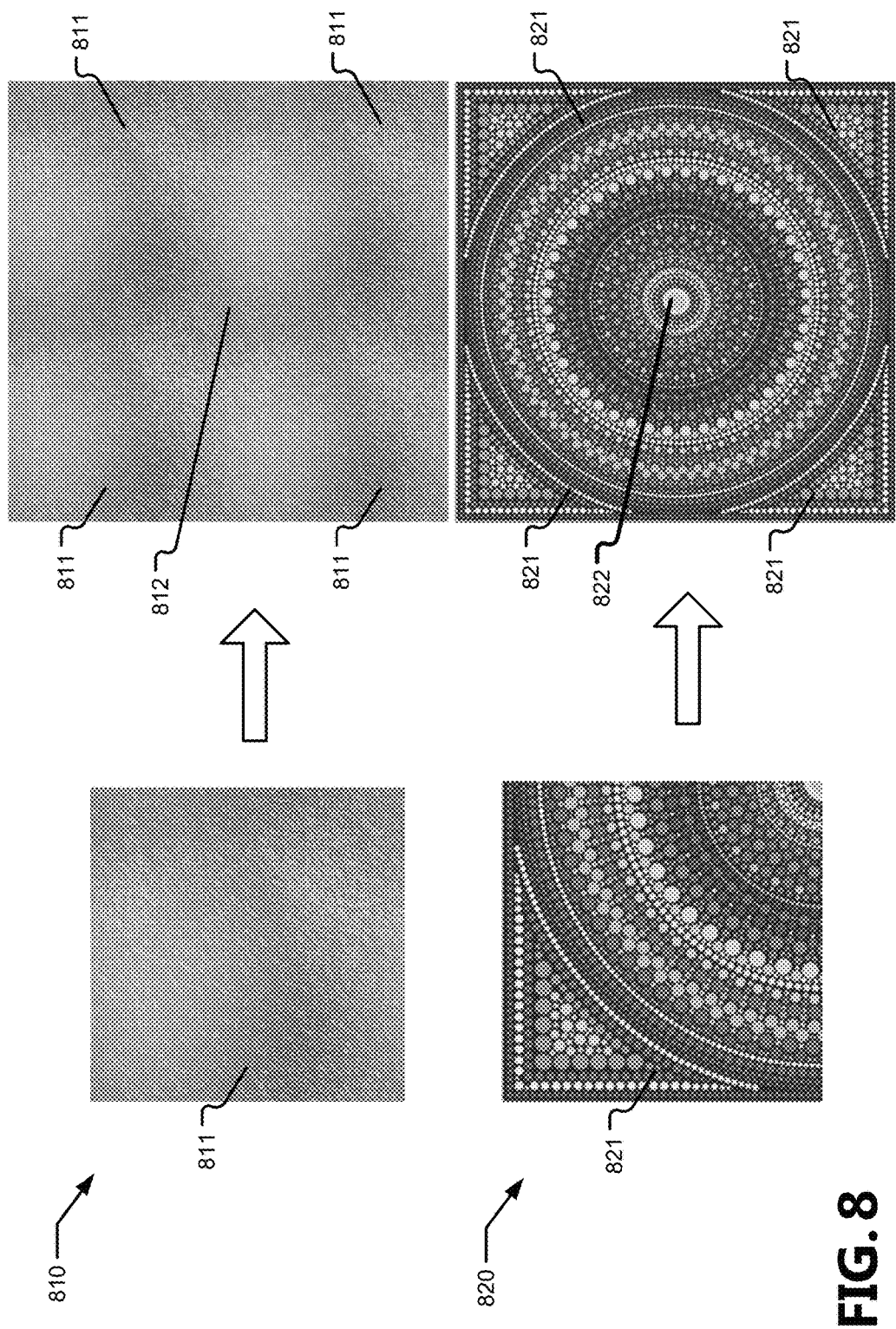
FIG. 8 illustrates two examples for tiling an image definition.

FIG. 8 illustrates two examples for tiling an image definition. In a first example tiling 810, an initial image 811 is repeated as necessary in the X and Y directions while maintaining the orientation of that initial image 811 in each tile of the tiled image 812. In a second example 820, an initial image 821 is repeated as necessary in the X and Y direction, while rotating the orientation of that initial image 821 in some or all of the tiles of the tiled image 822. As will be appreciated, a given image may be rotated across an X axis, Y axis, or both axes, and two rotations about a given axis (or axes) will result in the initial orientation. Depending on the image used for the image definition, various tiling methods or stretching of the image may be preferred, which may be indicated to the EAE 180 via metadata associated with those images, or user preferences.

Figure 9:
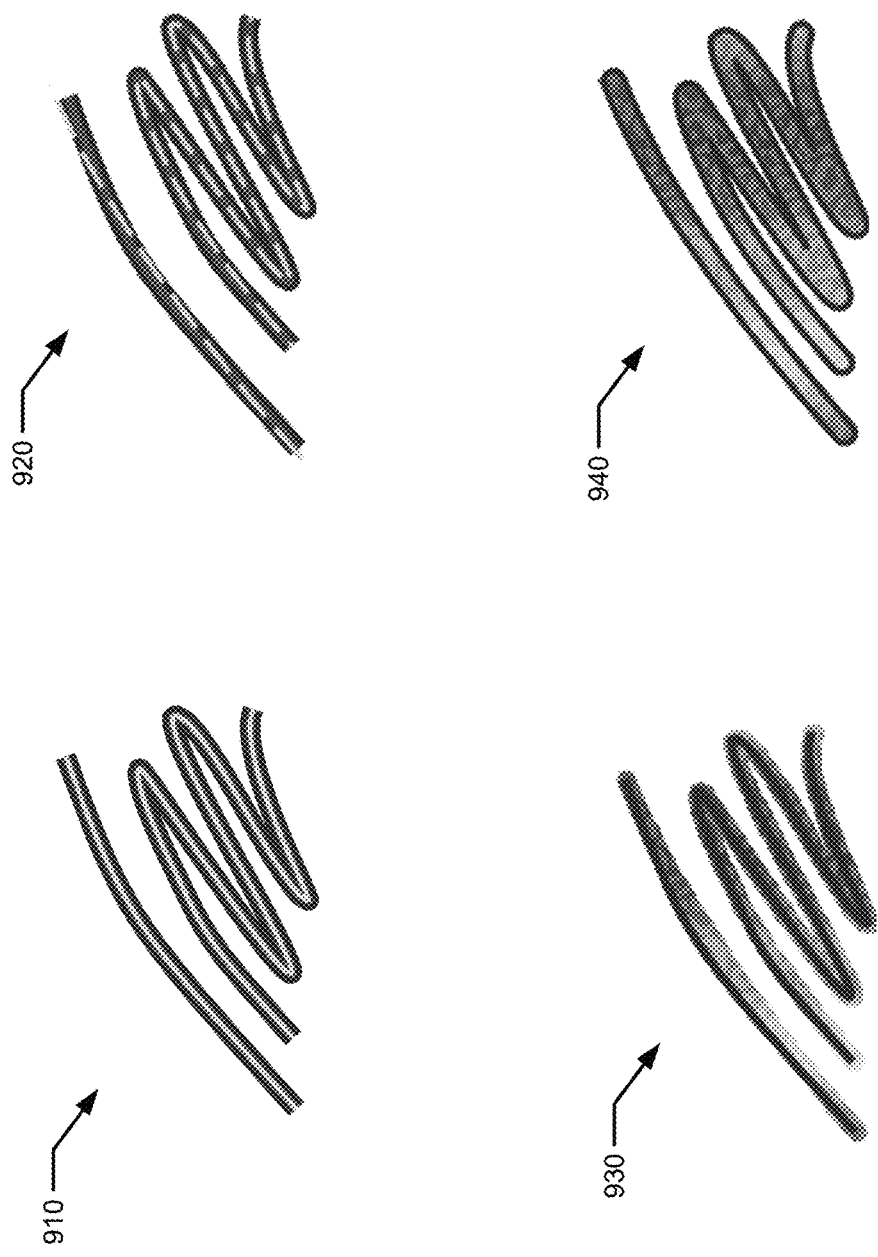
FIG. 9 illustrates various layered ink effects.

FIG. 9 illustrates various layered graphical effects applied as ink effects. Each of the four examples show different layerings of ink effects and basic geometries with the same set of strokes. When layering ink effects, multiple calls from stroke renderers 130 or 150 may be make for a single set of strokes with different draw parameters but the same location data and (optional) pressure data so that the strokes are rendered multiple times in the same location with different effects to produce the layered effect. As will be appreciated, the resulting geometries may be treated as one object or as separate objects in the EAE 180 in different aspects.

As illustrated, the first example 910 and the second example 920 demonstrate how transparencies may be used with layered ink effects. The first example 910 demonstrates the layering of two renderings of geometries, one black, one gray, for the same stroke but with different draw parameters so that the gray geometry is smaller than the black geometry and can be shown "on top" of the black geometry for a striped effect. Similarly, the second example 920 uses multiple renderings of the same strokes with different draw parameters to create a "roadway" effect where striped geometry for the strokes are layered on top of gray and black geometries.

As illustrated, the third example 930 and the fourth example 940 demonstrate how image definitions may be used with layered ink effects. The third example 930 shows an image definition being used as surrounding a plain stroke definition of black line geometry to create a blooming effect from the plain line geometry, while the fourth example 940 shows the image definition geometry being shown smaller and on top of plain black line geometry to create a bordered effect for the image geometry. As will be appreciated, although not illustrated, spectral line ink effects may also be used in layered ink effects.

Although FIGS. 2-5 are generally discussed in terms of spectral lines, and FIGS. 6-9 are generally discussed in terms of image files being used for advanced ink effects, one of ordinary skill in the art will recognize teachings that are applicable to ink effects from all of the FIGURES.

Figure 10:
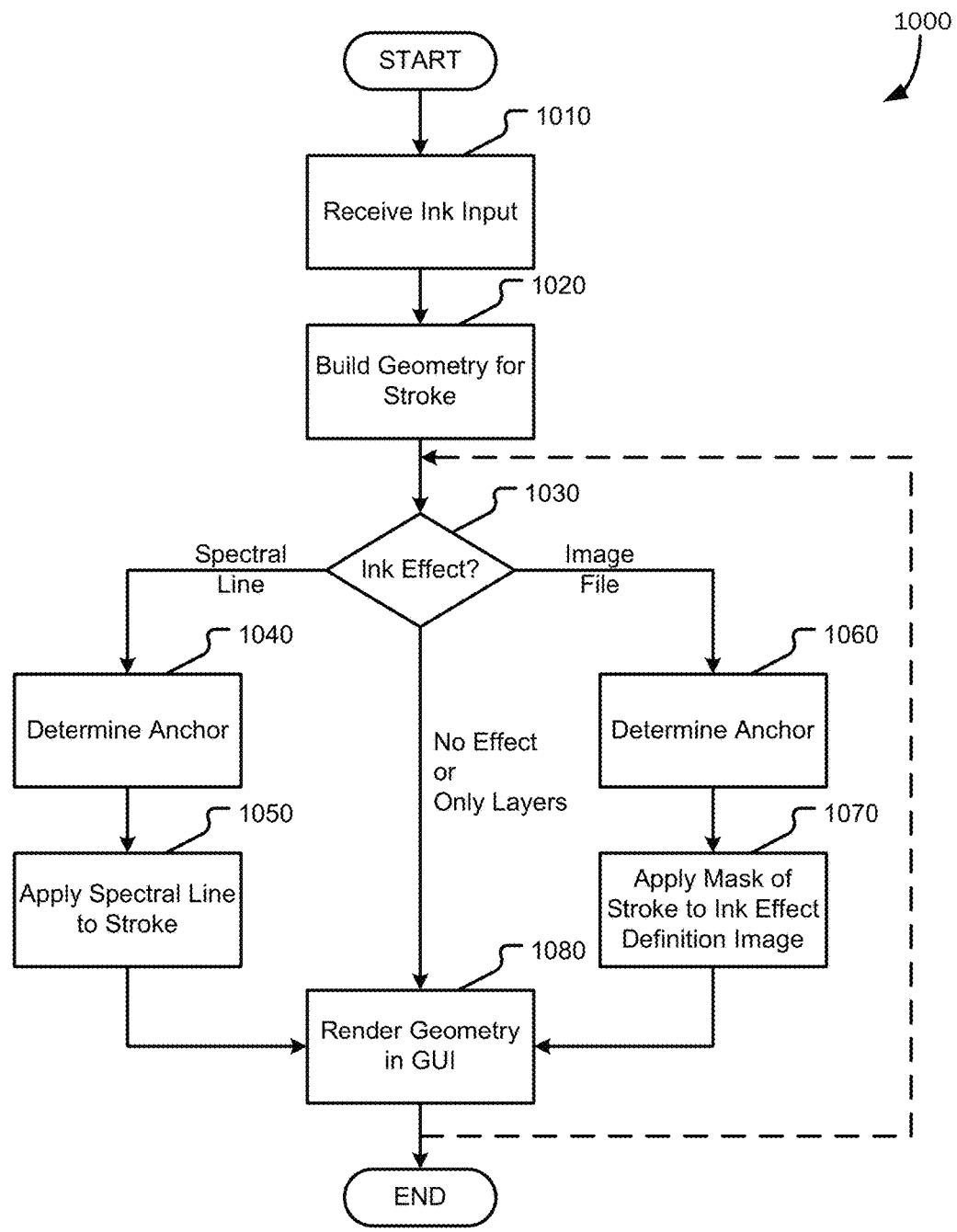
FIG. 10 is a flowchart showing general stages involved in an example method for providing advanced ink effects.

FIG. 10 is a flowchart showing general stages involved in an example method 1000 for providing graphical effects as advanced ink effects. Method 1000 begins at OPERATION 1010, where ink inputs are received in a GUI (via user interaction in the GUI for a "wet" stroke) or retrieved from a document store (e.g., stored ink objects or "dry" strokes). The ink inputs contain coordinate data for where in the GUI or canvas they were received or belong, and may optionally include metadata related to pressure on a touchpad for the received inputs (if appropriate), velocity at which the input is received (e.g., whether a user is quickly or slowly changing locations at which input is received), the device which made the input, etc. Additionally, drawing parameters set within the EAE 180 are received in OPERATION 1010, such as, for example, whether the user has selected an ink effect, a size of the geometry to be based around the inputs (e.g., a pt size, a pixel size, a unit size), a shape or stamp for building the geometry (e.g., a circle, a square, a star, a hexagon, a rhombus), a color, a transparency, etc. When an ink effect has been selected, a user may select multiple different drawing parameters, which may be layered and included in a layered ink effect definition 160, an image file for use as an ink effect definition 160, and/or a spectral line for use as an ink effect definition 160 and the associated parameters with those ink effects (e.g., anchor points, tiling/stretching, orientations in which to apply the effects, order of layers).

At OPERATION 1020 the geometry to represent the ink input is built based on the drawing parameters of the ink input. The geometry enables the stroke to be represented as a two dimensional object in the EAE 180. Method 1000 then proceeds to DECISION 1030 where it is determined whether an ink effect is to be applied when rendering the geometry in the GUI.

When it is determined at DECISION 1030 that the user has selected an ink effect of a spectral line, method 1000 proceeds to OPERATION 1040, where an anchor in the ink effect definition 160 is determined. Anchors enable a desired starting position in the spectral line, and may specify a given color of the colors comprising the spectral line to be used first when applying the spectral line to the geometry, which may be a preferred color (e.g., always start with the first color in the spectral line), a random color, or a color based on the last used color from a previous stroke (e.g., if the last color applied to the last stroke inputted is color A, use color B). When a user breaks an ink object into multiple ink objects, the new ink objects may retain anchors so that they retain their original ink effects, or new anchors may be assigned to at least one of the new ink objects so that new ink effects are applied to the at least one new ink objects.

At OPERATION 1050 the spectral line is applied from the anchor color of the spectral line to the geometry of the stroke. Depending on the length of the stroke, the length of a draw distance drawing parameter, whether the color series of the spectral line is variable-length-enabled for individual colors or each color is afforded the same relative length when applied, the orientation of application (e.g., horizontally, along the path of the stroke, across the stroke), and the length of the stroke, the spectral line will be applied differently to the geometry of the stroke. Example applications of a spectral line to stroke geometry are discussed in relation to FIGS. 2-5. The spectral line defines the colors that are applied as a mesh (e.g., a triangular mesh) or as a raster map to the geometry of a stroke. Method 1000 then proceeds to OPERATION 1080, where the geometry with the applied mesh (or raster map) is rendered in the GUI.

When it is determined at DECISION 1030 that the user has selected an ink effect of an image file, method 1000 proceeds to OPERATION 1060, where an anchor in the ink effect definition 160 is determined. Anchors enable a desired starting position in the image file and orientation by which the image is to be applied to the geometry (e.g., horizontally, vertically, X degrees from horizontal or vertical). Anchors may specify that a stroke or a collection of strokes may be placed relative to the coordinates of the image file so that the masks applied to the geometry include specific portions of the image file. The anchor may be based on the previous stroke's anchor value (first or last location and/or orientation of the stroke), a canvas position of the stroke, or a preferred position and orientation in the image. When a user breaks an ink object into multiple ink objects, the new ink objects may retain anchors so that they retain their original ink effects, or new anchors may be assigned to at least one of the new ink objects so that new ink effects are applied to the at least one new ink objects.

At OPERATION 1070 the image file is applied from the anchor position in the image file to the geometry of the stroke. Depending on the relative sizes of the geometry of a stroke or a group of strokes compared to the size of the image definition, the image definition may be tiled or stretched (or shrunk) to account for the size of the geometry. The geometry is applied to the image to create an ink effect mask. The geometry is placed on the image defined by the user to use as an ink effect definition 160 (or stretched/tiled version thereof) according to the anchor point and the pixels of the image definition that intersect the geometry are transmitted to be rendered in the GUI so that the inking effect desired by the user matches the size and shape of geometry for the stroke. Examples of using an ink effect mask to apply an image file to stroke geometry are discussed in relation to FIGS. 6-9. Method 1000 then proceeds to OPERATION 1080 where the ink effect mask is rendered in the GUI.

When it is determined at DECISION 1030 that the user has not selected an ink effect or the ink effect selected only calls for layers of geometries that do not invoke spectral lines or image files to apply to the geometries (e.g., geometries to be rendered with solid colors), method 1000 proceeds to OPERATION 1080, where the geometries for the strokes are rendered in the GUI. In various aspects, the multiple geometries may be treated as separate objects in the EAE 180 or as a single object.

Method 1000 may repeat OPERATIONS 1030-1080 multiple times, once for each layer of the ink effect, which may include geometries that have no advanced ink effects or other graphical effects applied thereto as well as geometries that have had an advanced ink effect (e.g., a spectral line or an image file) applied thereto. Method 1000 then concludes.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 11:
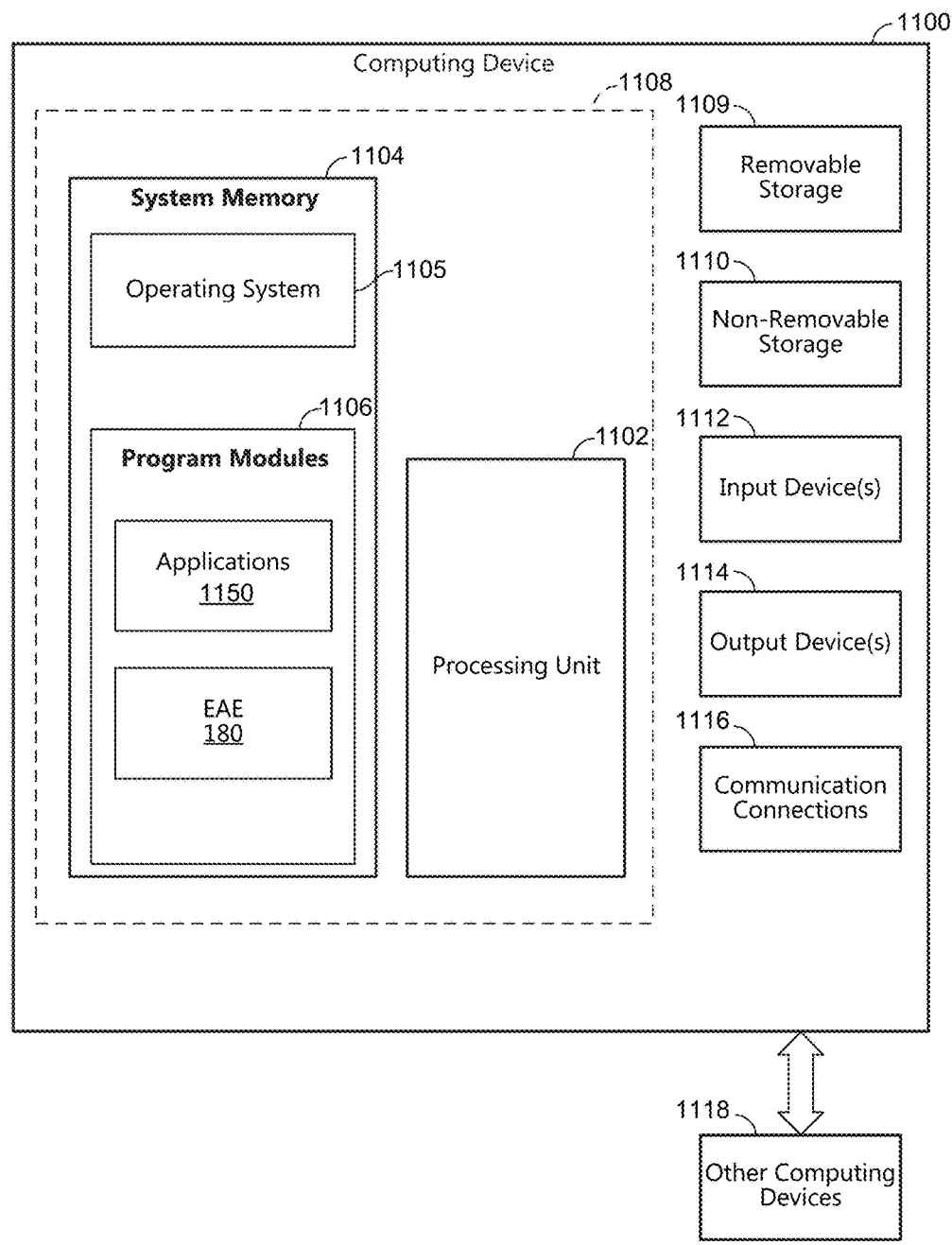
FIG. 11 is a block diagram illustrating physical components of a computing device with which examples may be practiced.
Figure 12A:
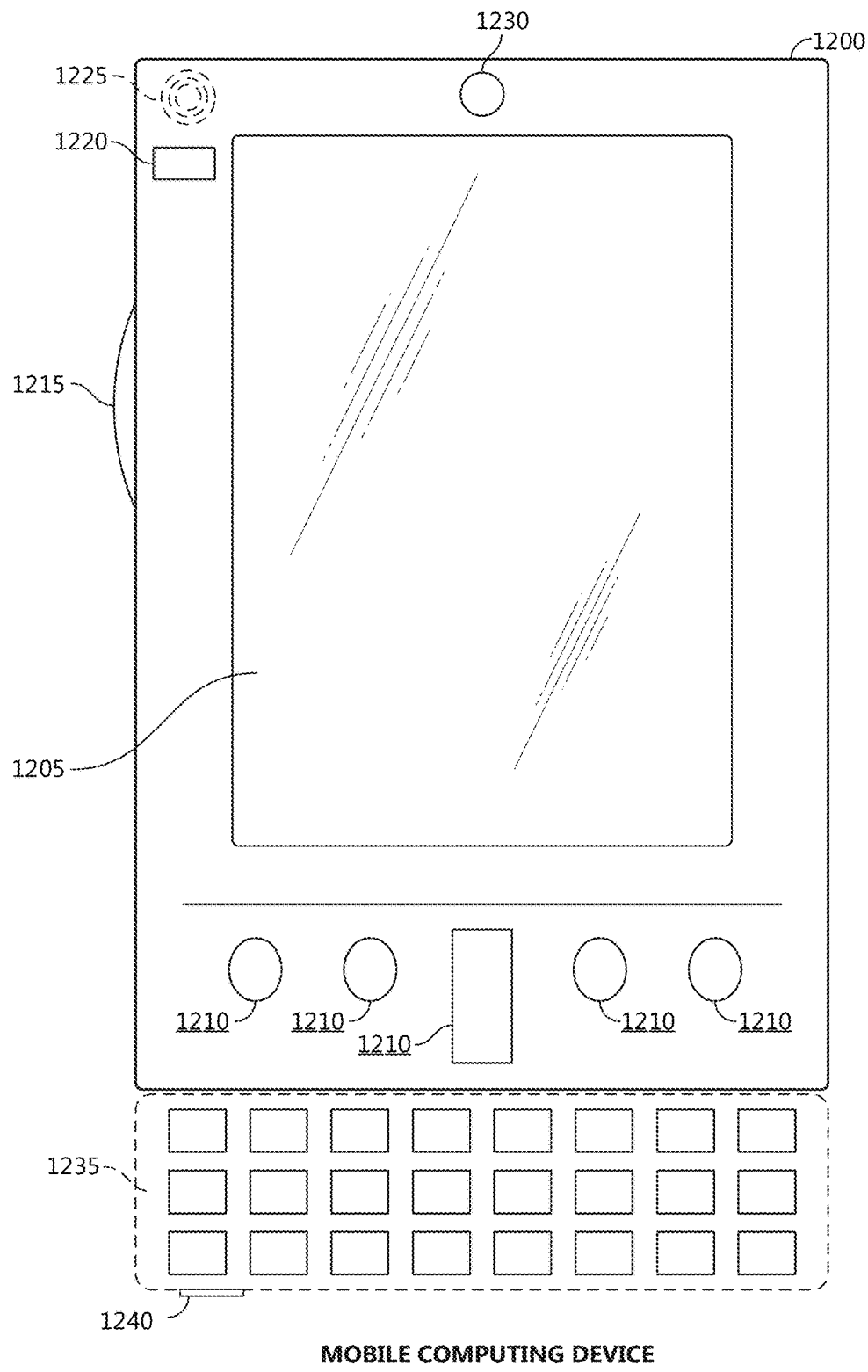
FIGS. 12A and 12B are block diagrams of a mobile computing device with which aspects may be practiced.
Figure 12B:
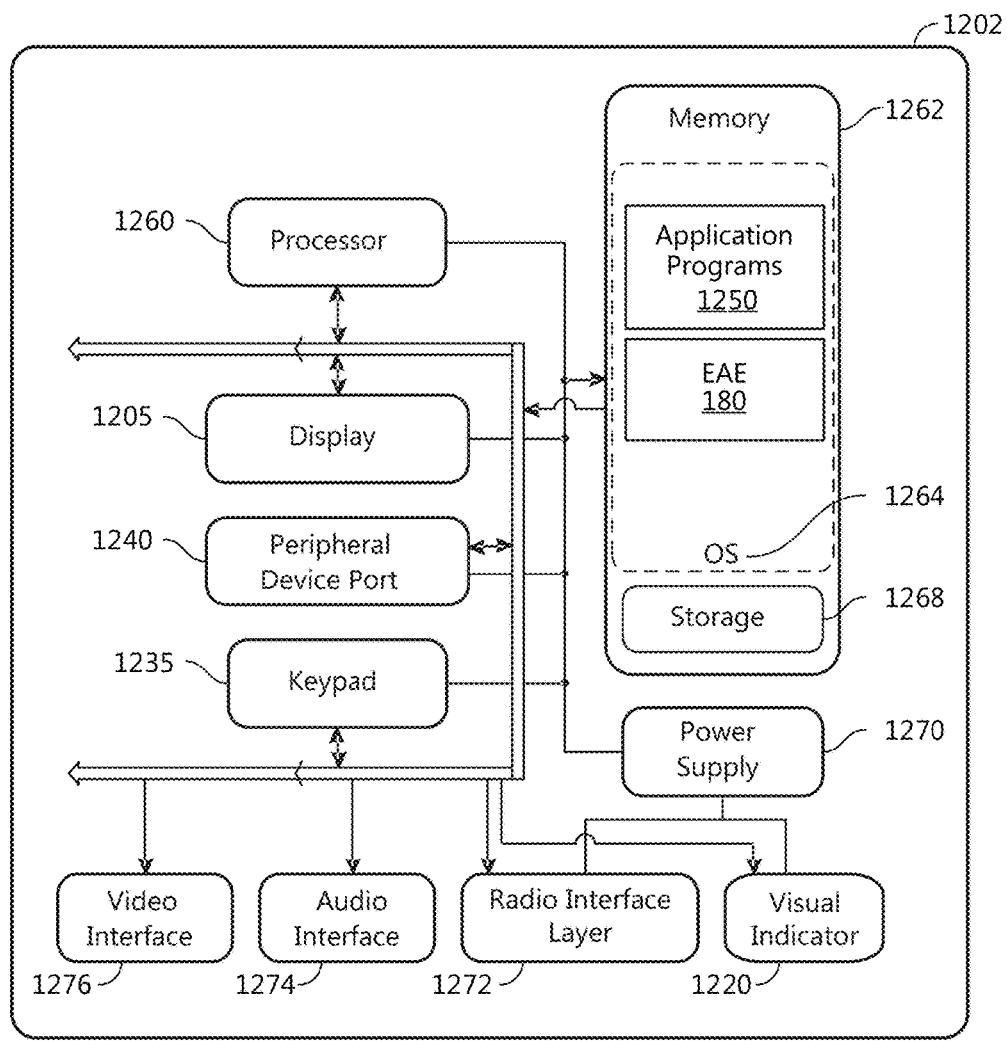
Figure 13:
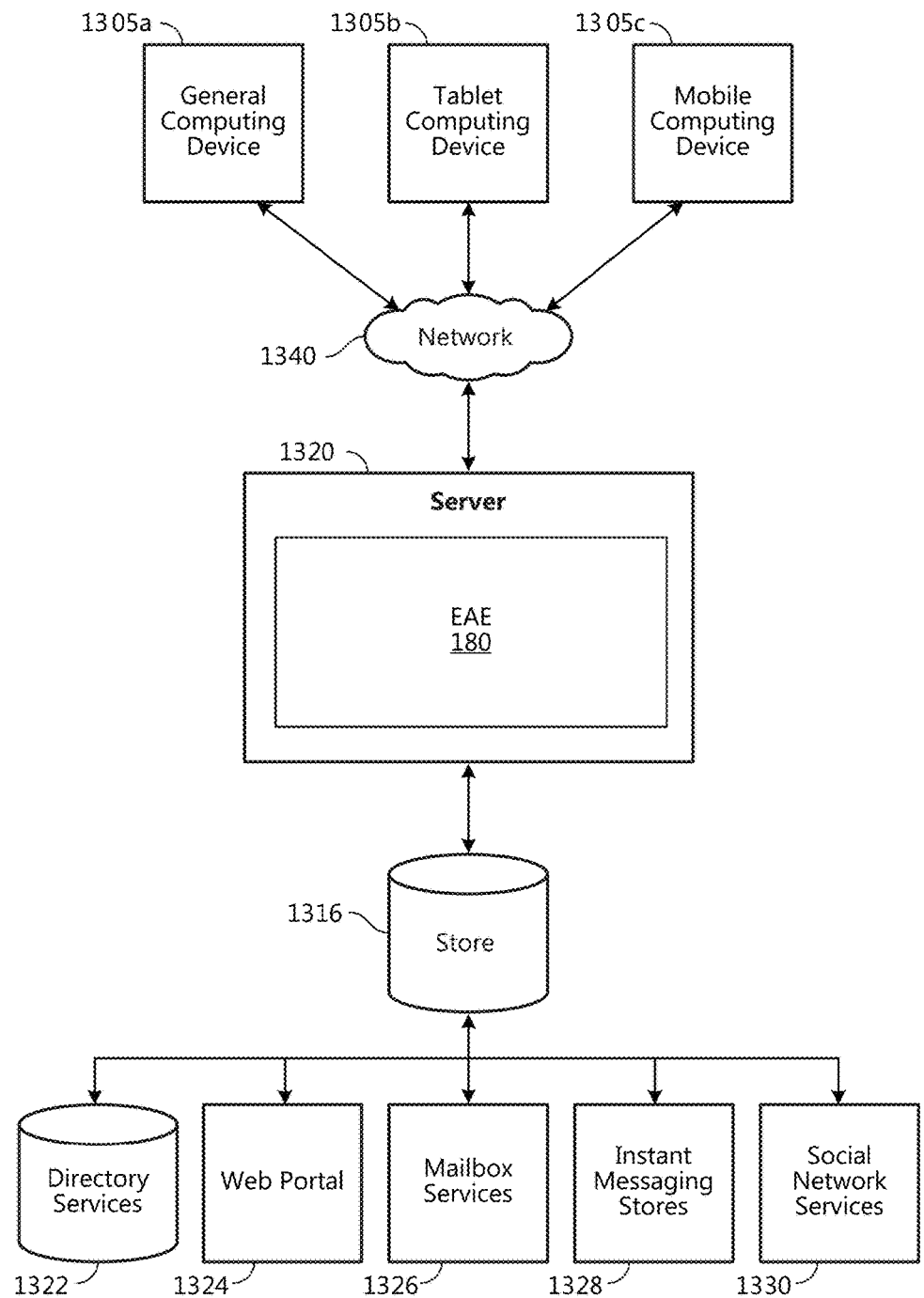
FIG. 13 is a block diagram of a distributed computing system in which aspects may be practiced.

FIGS. 11-13 and the associated descriptions provide a discussion of a variety of operating environments in which examples are practiced. However, the devices and systems illustrated and discussed with respect to FIGS. 11-13 are for purposes of example and illustration and are not limiting of a vast number of computing device configurations that are utilized for practicing aspects, described herein.

FIG. 11 is a block diagram illustrating physical components (i.e., hardware) of a computing device 1100 with which examples of the present disclosure may be practiced. In a basic configuration, the computing device 1100 includes at least one processing unit 1102 and a system memory 1104. According to an aspect, depending on the configuration and type of computing device, the system memory 1104 comprises, but is not limited to, volatile storage (e.g., random access memory), non-volatile storage (e.g., read-only memory), flash memory, or any combination of such memories. According to an aspect, the system memory 1104 includes an operating system 1105 and one or more program modules 1106 suitable for running software applications 1150. According to an aspect, the system memory 1104 includes an EAE 180, operable to enable a software application 1150 to employ the teachings of the present disclosure via stored instructions. The operating system 1105, for example, is suitable for controlling the operation of the computing device 1100. Furthermore, aspects are practiced in conjunction with a graphics library, other operating systems, or any other application program, and is not limited to any particular application or system. This basic configuration is illustrated in FIG. 11 by those components within a dashed line 1108. According to an aspect, the computing device 1100 has additional features or functionality. For example, according to an aspect, the computing device 1100 includes additional data storage devices (removable and/or non-removable) such as, for example, magnetic disks, optical disks, or tape. Such additional storage is illustrated in FIG. 11 by a removable storage device 1109 and a non-removable storage device 1110.

As stated above, according to an aspect, a number of program modules and data files are stored in the system memory 1104. While executing on the processing unit 1102, the program modules 1106 (e.g., EAE 180) perform processes including, but not limited to, one or more of the stages of the method 1000 illustrated in FIG. 10. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, the computing device 1100 has one or more input device(s) 1112 such as a keyboard, a mouse, a pen, a sound input device, a touch input device, etc. The output device(s) 1114 such as a display, speakers, a printer, etc. are also included according to an aspect. The aforementioned devices are examples and others may be used. According to an aspect, the computing device 1100 includes one or more communication connections 1116 allowing communications with other computing devices 1118. Examples of suitable communication connections 1116 include, but are not limited to, radio frequency (RE) transmitter, receiver, and/or transceiver circuitry; universal serial bus (USB), parallel, and/or serial ports.

The term computer readable media, as used herein, includes computer storage media apparatuses and articles of manufacture. Computer storage media include volatile and nonvolatile, removable and non-removable media implemented in any method or technology for storage of information, such as computer readable instructions, data structures, or program modules. The system memory 1104, the removable storage device 1109, and the non-removable storage device 1110 are all computer storage media examples (i.e., memory storage). According to an aspect, computer storage media include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1100. According to an aspect, any such computer storage media is part of the computing device 1100. Computer storage media do not include a carrier wave or other propagated data signal.

According to an aspect, communication media are embodied by computer readable instructions, data structures, program modules, or other data in a modulated data signal, such as a carrier wave or other transport mechanism, and include any information delivery media. According to an aspect, the term "modulated data signal" describes a signal that has one or more characteristics set or changed in such a manner as to encode information in the signal. By way of example, and not limitation, communication media include wired media such as a wired network or direct-wired connection, and wireless media such as acoustic, radio frequency (RE), infrared, and other wireless media.

FIGS. 12A and 12B illustrate a mobile computing device 1200, for example, a mobile telephone, a smart phone, a tablet personal computer, a laptop computer, and the like, with which aspects may be practiced. With reference to FIG. 12A, an example of a mobile computing device 1200 for implementing the aspects is illustrated. In a basic configuration, the mobile computing device 1200 is a handheld computer having both input elements and output elements. The mobile computing device 1200 typically includes a display 1205 and one or more input buttons 1210 that allow the user to enter information into the mobile computing device 1200. According to an aspect, the display 1205 of the mobile computing device 1200 functions as an input device (e.g., a touch screen display). If included, an optional side input element 1215 allows further user input. According to an aspect, the side input element 1215 is a rotary switch, a button, or any other type of manual input element. In alternative examples, mobile computing device 1200 incorporates more or fewer input elements. For example, the display 1205 may not be a touch screen in some examples. In alternative examples, the mobile computing device 1200 is a portable phone system, such as a cellular phone. According to an aspect, the mobile computing device 1200 includes an optional keypad 1235. According to an aspect, the optional keypad 1235 is a physical keypad. According to another aspect, the optional keypad 1235 is a "soft" keypad generated on the touch screen display. In various aspects, the output elements include the display 1205 for showing a graphical user interface (GUI), a visual indicator 1220 (e.g., a light emitting diode), and/or an audio transducer 1225 (e.g., a speaker). In some examples, the mobile computing device 1200 incorporates a vibration transducer for providing the user with tactile feedback. In yet another example, the mobile computing device 1200 incorporates a peripheral device port 1240, such as an audio input (e.g., a microphone jack), an audio output (e.g., a headphone jack), and a video output (e.g., a HDMI port) for sending signals to or receiving signals from an external device.

FIG. 12B is a block diagram illustrating the architecture of one example of a mobile computing device. That is, the mobile computing device 1200 incorporates a system (i.e., an architecture) 1202 to implement some examples. In one example, the system 1202 is implemented as a "smart phone" capable of running one or more applications (e.g., browser, e-mail, calendaring, contact managers, messaging clients, games, and media clients/players). In some examples, the system 1202 is integrated as a computing device, such as an integrated personal digital assistant (PDA) and wireless phone.

According to an aspect, one or more application programs 1250 are loaded into the memory 1262 and run on or in association with the operating system 1264. Examples of the application programs include phone dialer programs, e-mail programs, personal information management (PIM) programs, word processing programs, spreadsheet programs, Internet browser programs, messaging programs, and so forth. According to an aspect, EAE 180 is loaded into memory 1262. The system 1202 also includes a non-volatile storage area 1268 within the memory 1262. The non-volatile storage area 1268 is used to store persistent information that should not be lost if the system 1202 is powered down. The application programs 1250 may use and store information in the non-volatile storage area 1268, such as e-mail or other messages used by an e-mail application, and the like. A synchronization application (not shown) also resides on the system 1202 and is programmed to interact with a corresponding synchronization application resident on a host computer to keep the information stored in the non-volatile storage area 1268 synchronized with corresponding information stored at the host computer. As should be appreciated, other applications may be loaded into the memory 1262 and run on the mobile computing device 1200.

According to an aspect, the system 1202 has a power supply 1270, which is implemented as one or more batteries. According to an aspect, the power supply 1270 further includes an external power source, such as an AC adapter or a powered docking cradle that supplements or recharges the batteries.

According to an aspect, the system 1202 includes a radio 1272 that performs the function of transmitting and receiving radio frequency communications. The radio 1272 facilitates wireless connectivity between the system 1202 and the "outside world," via a communications carrier or service provider. Transmissions to and from the radio 1272 are conducted under control of the operating system 1264. In other words, communications received by the radio 1272 may be disseminated to the application programs 1250 via the operating system 1264, and vice versa.

According to an aspect, the visual indicator 1220 is used to provide visual notifications and/or an audio interface 1274 is used for producing audible notifications via the audio transducer 1225. In the illustrated example, the visual indicator 1220 is a light emitting diode (LED) and the audio transducer 1225 is a speaker. These devices may be directly coupled to the power supply 1270 so that when activated, they remain on for a duration dictated by the notification mechanism even though the processor 1260 and other components might shut down for conserving battery power. The LED may be programmed to remain on indefinitely until the user takes action to indicate the powered-on status of the device. The audio interface 1274 is used to provide audible signals to and receive audible signals from the user. For example, in addition to being coupled to the audio transducer 1225, the audio interface 1274 may also be coupled to a microphone to receive audible input, such as to facilitate a telephone conversation. According to an aspect, the system 1202 further includes a video interface 1276 that enables an operation of an on-board camera 1230 to record still images, video stream, and the like.

According to an aspect, a mobile computing device 1200 implementing the system 1202 has additional features or functionality. For example, the mobile computing device 1200 includes additional data storage devices (removable and/or non-removable) such as, magnetic disks, optical disks, or tape. Such additional storage is illustrated in FIG. 12B by the non-volatile storage area 1268.

According to an aspect, data/information generated or captured by the mobile computing device 1200 and stored via the system 1202 are stored locally on the mobile computing device 1200, as described above. According to another aspect, the data are stored on any number of storage media that are accessible by the device via the radio 1272 or via a wired connection between the mobile computing device 1200 and a separate computing device associated with the mobile computing device 1200, for example, a server computer in a distributed computing network, such as the Internet. As should be appreciated, such data/information are accessible via the mobile computing device 1200 via the radio 1272 or via a distributed computing network. Similarly, according to an aspect, such data/information are readily transferred between computing devices for storage and use according to well-known data/information transfer and storage means, including electronic mail and collaborative data/information sharing systems.

FIG. 13 illustrates one example of the architecture of a system for automatic presentation of blocks of repeated content as described above. Content developed, interacted with, or edited in association with the EAE 180 is enabled to be stored in different communication channels or other storage types. For example, various documents may be stored using a directory service 1322, a web portal 1324, a mailbox service 1326, an instant messaging store 1328, or a social networking site 1330. The EAE 180 is operative to use any of these types of systems or the like for distribution of selected content, as described herein. According to an aspect, a server 1320 provides the EAE 180 to clients 1305*a-c* (generally clients 1305). As one example, the server 1320 is a web server providing the EAE 180 over the web. The server 1320 provides the EAE 180 over the web to clients 1305 through a network 1340. By way of example, the client computing device is implemented and embodied in a personal computer 1305*a*, a tablet computing device 1305*b* or a mobile computing device 1305*c* (e.g., a smart phone), or other computing device. Any of these examples of the client computing device are operable to obtain content from the store 1316.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope of the present disclosure.

We claim:

1. A method for applying graphical effects to an inking input in a graphical user interface, comprising:
   receiving a single stroke comprising the inking input, wherein the single stroke comprises a plurality of pointer inputs representative of location data;
   when the single stroke is received:
      building a non-vector geometry for the single stroke based on the location data;
      receiving a first ink effect definition as a first graphical effect to apply to the inking input;
      masking the first ink effect definition with the non-vector geometry to create a first inking effect mask;
      rendering, utilizing pixel values, the first inking effect mask in the graphical user interface;
      receiving a second ink effect definition as a second graphical effect to apply to the inking input;
      masking the second ink effect definition with the non-vector geometry to create a second inking effect mask; and
      rendering, utilizing pixel values, the second inking effect mask in the graphical user interface as a layer atop the rendered first inking effect mask.

2. The method of claim 1, wherein the second ink effect definition includes application of a spectral line as a mesh to the non-vector geometry.

3. The method of claim 1, wherein the first ink effect definition comprises an image file and wherein when the image file is smaller in size than the non-vector geometry, tiling the image file to produce a tiled image at least as large as the non-vector geometry.

4. The method of claim 3, wherein the image file is tiled by rotating the image file about an axis comprising an edge of the image file.

5. The method of claim 1, wherein the first ink effect definition comprises an image file and wherein when the image file is smaller in size than the non-vector geometry, stretching the image file to be at least as large as the non-vector geometry.

6. The method of claim 1, wherein the first ink effect definition is comprises an image file and wherein the image file is a spectral line defining a series of colors.

7. The method of claim 1, wherein the single stroke comprises a first single stroke and wherein the method further comprises:
   receiving a second single stroke, the second single stroke having a starting position different from a starting position of the first single stroke, and the second single stroke comprising a plurality of pointer inputs representative of location data;
   when the second single stroke is received:
      building a non-vector second geometry for the second single stroke based on the location data;
      masking the first ink effect definition with the non-vector second geometry to create a first inking effect mask for the second single stroke;
      rendering, utilizing pixel values, the first inking effect mask for the second single stroke in the graphical user interface;
      masking the second ink effect definition with the non-vector second geometry to create a second inking effect mask for the second single stroke; and
      rendering, utilizing pixel values, the second inking effect mask for the second single stroke in the graphical user interface as a layer atop the rendered first inking effect mask for the second single stroke.

8. The method of claim 1, wherein the graphical user interface comprises a graphical user interface of a note taking application.

9. The method of claim 1, wherein the first ink definition comprises an image file and wherein the method further comprises receiving a user-defined anchor specifying a starting position within the image file from which to apply the non-vector geometry, wherein masking the image file with the non-vector geometry to create the inking effect mask includes masking the image file at the anchor with the non-vector geometry to create the inking effect mask and wherein the second graphical effect utilizes the same user-defined anchor as the first graphical effect from which to apply the non-vector geometry.

10. The method of claim 1, wherein the plurality of pointer inputs are additionally representative of pressure data and wherein building the non-vector geometry for the single stroke is additionally based on the pressure data.

11. The method of claim 1, wherein the non-vector geometry of the single stroke comprises an outline of the single stroke.

12. A method for applying graphical effects to an inking input in a graphical user interface, comprising:
receiving a single stroke inking input, wherein the single stroke comprises a plurality of pointer inputs representative of location data;
when the single stroke is received:
building a non-vector geometry for the single stroke based on the location data;
receiving a spectral line comprising a plurality of colors in a series as a first graphical effect to apply to the single stroke;
receiving a user-defined anchor in the spectral line that specifies one color of the plurality of colors as a start color;
applying a mesh to the non-vector geometry wherein the mesh applies the plurality of colors to the non-vector geometry according to the series starting with the start color;
rendering, utilizing pixel values, the non-vector geometry with the mesh in the graphical user interface;
receiving an ink effect definition, that is different from the spectral line, as a second graphical effect to apply to the single stroke;
masking the ink effect definition with the non-vector geometry to create an inking effect mask; and
rendering, utilizing pixel values, the inking effect mask in the graphical user interface as a layer atop the rendered geometry with the mesh.

13. The method of claim 12, wherein the mesh applies the plurality of colors along a width or a length of the non-vector geometry.

14. The method of claim 12, wherein the mesh applies the plurality of colors according to a variable length along the geometry according to a variable length of application associated with each color of the plurality of colors.

15. The method of claim 12, wherein a second mesh applies the plurality of colors, ordered according to a second user-defined anchor that specifies another color of the plurality of colors as a different start color, to a non-vector second geometry intersecting the non-vector geometry.

16. The method of claim 12, wherein the plurality of pointer inputs are additionally representative of pressure data and wherein building the non-vector geometry for the single stroke is additionally based on the pressure data.

17. The method of claim 12, wherein the non-vector geometry of the single stroke comprises an outline of the single stroke.

18. A system for applying graphical effects to inking input in a graphical user interface, comprising:
a memory storing instructions including a plurality of ink effect definitions that provide one or more graphical effects to apply to the inking input; and
a processor that executes the stored instructions, the instructions causing the processor to perform the functions of:
a wet stroke processor operable to receive pointer inputs comprising location data in the graphical user interface in which the pointer inputs were made to group the pointer inputs into strokes; and
a wet stroke renderer operable to:
receive a wet stroke from the wet stroke processor to produce a non-vector geometry for the wet stroke, wherein the geometry is based on the location data, wherein the wet stroke is an in-progress single stroke;
when the wet stroke is received:
associate at least two ink effect definitions from the plurality of ink effect definitions for rendering, utilizing pixel values, with the non-vector geometry; and
transmit the non-vector geometry to an operating system graphics application program interface for rendering, utilizing pixel values, the wet stroke with the at least two ink effect definitions, wherein one of the at least two ink effect definitions is rendered first and the other of the at least two ink effect definitions is rendered as a layer atop the first rendered ink effect definition, in the graphical user interface.

19. The system of claim 18, wherein a given ink effect definition of the plurality of ink effect definitions is a plurality of colors, wherein the wet stroke renderer is further operable to set a series for the given ink effect definition for each of the strokes grouped by the wet stroke processor.

20. The system of claim 18, wherein the instructions further cause the processor to perform the functions of:
a stroke queue operable to receive the grouped strokes from the wet stroke processor when a given stroke is complete, and to incorporate the given stroke as a single dry stroke into a structure of a document being authored via the graphical user interface; and
a dry stroke renderer operable to:
retrieve the dry stroke from the structure of the document to produce a non-vector dry geometry for the dry stroke,
associate at least two ink effect definitions definition from the plurality of ink effect definitions for rendering, utilizing pixel values, with the non-vector dry geometry, and
transmit the non-vector dry geometry to the operating system graphics application program interface for rendering, utilizing pixel values, in the graphical user interface wherein one of the at least two ink effect definitions for rendering with the non-vector dry geometry is rendered first and the other of the at least two ink effect definitions for rendering with the non-vector dry geometry is rendered as a layer atop the first rendered ink effect definition.

* * * * *